US009058542B2

(12) United States Patent
Ehlgen et al.

(10) Patent No.: US 9,058,542 B2
(45) Date of Patent: Jun. 16, 2015

(54) METHOD AND DEVICE FOR CHECKING THE VISIBILITY OF A CAMERA FOR SURROUNDINGS OF AN AUTOMOBILE

(75) Inventors: Tobias Ehlgen, Ravensburg (DE); Daniel Lipinski, Redwood City, CA (US)

(73) Assignee: ROBERT BOSCH GMBH, Stuttgart (DE)

( * ) Notice: Subject to any disclaimer, the term of this patent is extended or adjusted under 35 U.S.C. 154(b) by 251 days.

(21) Appl. No.: 13/580,723

(22) PCT Filed: Feb. 10, 2011

(86) PCT No.: PCT/EP2011/051927
§ 371 (c)(1),
(2), (4) Date: Dec. 5, 2012

(87) PCT Pub. No.: WO2011/104123
PCT Pub. Date: Sep. 1, 2011

(65) Prior Publication Data
US 2013/0070966 A1  Mar. 21, 2013

(30) Foreign Application Priority Data

Feb. 24, 2010  (DE) .......................... 10 2010 002 310

(51) Int. Cl.
*G06K 9/00* (2006.01)
*G06K 9/60* (2006.01)
*G06T 7/00* (2006.01)

(52) U.S. Cl.
CPC ............ *G06K 9/605* (2013.01); *G06K 9/00791* (2013.01); *G06T 7/0002* (2013.01); *G06T 2207/20021* (2013.01); *G06T 2207/30252* (2013.01)

(58) Field of Classification Search
None
See application file for complete search history.

(56) References Cited

U.S. PATENT DOCUMENTS

| 7,423,752 | B2 | 9/2008 | Leleve et al. |
| 2003/0197867 | A1 | 10/2003 | Kwon |
| 2005/0143887 | A1* | 6/2005 | Kinoshita ........................ 701/45 |
| 2006/0115121 | A1 | 6/2006 | Saka et al. |
| 2007/0194208 | A1 | 8/2007 | Stam et al. |
| 2008/0170754 | A1* | 7/2008 | Kawasaki ..................... 382/104 |
| 2008/0239076 | A1* | 10/2008 | Luo ............................... 348/148 |

(Continued)

FOREIGN PATENT DOCUMENTS

| CN | 1901659 | 1/2007 |
| EP | 1 411 469 | 4/2004 |

(Continued)

OTHER PUBLICATIONS

Translated version of JP 2001-028746.*

(Continued)

*Primary Examiner* — Sumati Lefkowitz
*Assistant Examiner* — Carol Wang
(74) *Attorney, Agent, or Firm* — Kenyon & Kenyon LLP

(57) ABSTRACT

A method for checking the visibility of a camera for surroundings of an automobile is proposed which includes receiving a camera image and a step of dividing the camera image into a plurality of partial images. A visibility value is determined based on a number of objects detected in the particular partial image. A visibility probability is subsequently determined for each of the partial images based on the blindness values and the visibility values of the particular partial images.

18 Claims, 4 Drawing Sheets

(56) References Cited

U.S. PATENT DOCUMENTS

2009/0135125 A1    5/2009  Fujita
2009/0154799 A1*   6/2009  Tsukada ................. 382/165
2009/0174773 A1*   7/2009  Gowdy et al. ............ 348/148
2009/0295917 A1*  12/2009  Zhang et al. ............ 348/119
2010/0097456 A1*   4/2010  Zhang et al. ............ 348/119

FOREIGN PATENT DOCUMENTS

EP          1 548 685        6/2005
JP         2001028746 A  *   1/2001    ............. H04N 7/18

OTHER PUBLICATIONS

Leleve J et al : "Fog Lamp Automation With Visibility Sensor the Next Step of Lighting Automation", VDI Berichte, Duesseldorf, DE, No. 1907, Jan. 1, 2005, pp. 151-160, XP008061020, ISSN : 0083-5560, section : Fog Detection by Dayfigure 4.

Busch C et al : "Wavelet transform for analyzing fog visibility", IEEE Intelligent Systems, IEEE Service Center, New York, NY, US, vol. 13, No. 6, Nov. 1, 1998, pp. 66-71, XP002247567, ISSN : 1094-7167, DOI : 10.1109/5254. 736004.

* cited by examiner

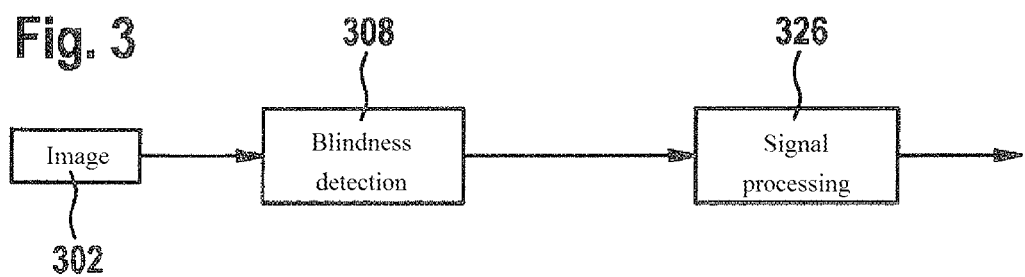
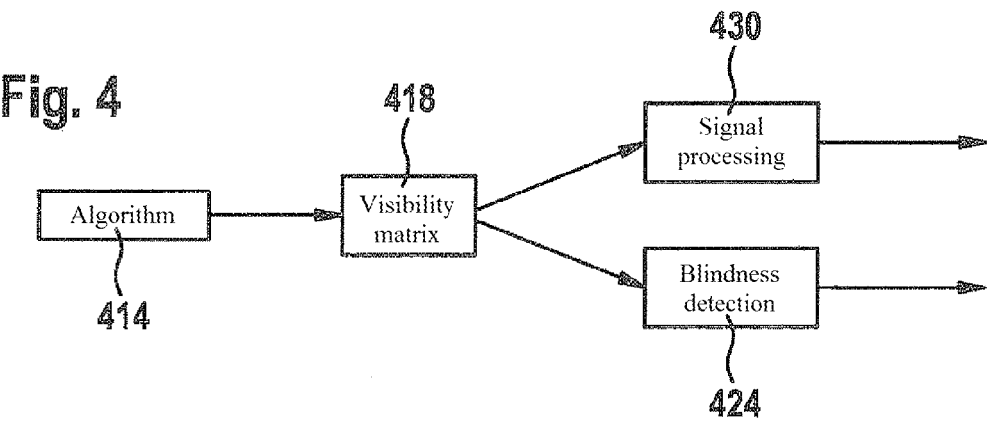

| | 202 | |
|---|---|---|
| 74<br>74<br>0<br>0<br>0 | 73<br>73<br>0<br>0<br>0 | 73<br>73<br>0<br>0<br>0 |
| 63<br>63<br>0<br>0<br>0 | 67<br>67<br>0<br>100<br>100 | 68<br>68<br>0<br>100<br>100 |
| 69<br>69<br>0<br>0<br>81 | 69<br>69<br>0<br>0<br>0 | 69<br>69<br>0<br>0<br>0 |

METHOD AND DEVICE FOR CHECKING THE VISIBILITY OF A CAMERA FOR SURROUNDINGS OF AN AUTOMOBILE

FIELD OF THE INVENTION

The present invention relates to a method for checking the visibility of a camera in the surroundings of an automobile, to a corresponding control unit and to a corresponding computer program product.

BACKGROUND INFORMATION

U.S. Pat. No. 7,423,752 B2 relates to fog detection algorithms which attempt to determine the visibility range of a camera in fog. A detection of an object is based on the detection of edges.

European patent document EP 1548685 B1 discusses a method in which information of 3D units as well as a number of vertical and horizontal edges are used to determine a blindness of the camera.

SUMMARY OF THE INVENTION

Against this background, the exemplary embodiments and/or exemplary methods of the present invention provide a method for checking the visibility of a camera in the surroundings of an automobile, furthermore a device which uses this method, and finally a corresponding computer program product according to the independent patent claims. Advantageous embodiments are derived from the particular subclaims and the following description.

The approach according to the exemplary embodiments and/or exemplary methods of the present invention facilitates a visibility check for cameras, in particular in the surroundings of an automobile. According to the exemplary embodiments and/or exemplary methods of the present invention, a camera image is divided for this purpose, and results of other measuring algorithms are incorporated into the evaluation. Special blindness signals may advantageously be generated for different functions, for example for operating a windshield heater when condensation forms.

According to one specific embodiment, a blindness probability may additionally be calculated for different areas in an image. The blindness probability may be offset against a visibility probability. Blindness signals may be generated therefrom for different algorithms. The algorithms, in turn, may enter a secure state when blindness is detected.

Visibility information may be used to support the blindness detection. In addition, a sensitivity of the blindness detection may be dependent on illumination. At night, for example, there is a lower probability of blindness occurring if few edges are found in the camera image. If the camera image is divided into blindness regions, blindness signals, in turn, may be calculated therefrom. For example, the regions in the upper area of the image are not relevant for the blindness detection of the lane detection function. According to the exemplary embodiments and/or exemplary methods of the present invention, debouncing of the blindness signals may be dependent on the period of time in which the blindness is detected.

The exemplary embodiments and/or exemplary methods of the present invention provide a method for checking the visibility of a camera for the surroundings of a vehicle, which includes the following steps: receiving a camera image via a receiving interface; dividing the camera image into a plurality of partial images; determining a visibility value for each of the partial images on the basis of a number of objects detected in the particular partial image; and determining a visibility probability for each of the partial images on the basis of the visibility values of the particular partial images.

The camera may be an image recording device which is situated in or on a vehicle. The camera may be configured to continuously record and provide image information or images of vehicle surroundings. The images may be used by different functions or consumers in the vehicle, for example a window heater or a lane assistant. If the camera is blind, the images provided to these functions contain no usable image information. If the blindness is not detected, this circumstance may result in a malfunction of the functions. The blindness may be caused, for example, by extreme dirtiness of the camera lens or by a defect in the camera. The blindness may affect the entire image area or only one or multiple image sections of the image provided by the camera. According to the exemplary embodiments and/or exemplary methods of the present invention, the total image is therefore divided into partial images, each partial image including a certain area of the total image. All partial images together may yield the total image.

A visibility probability is determined for each partial image. The visibility probability defines the probability with which a visibility of the camera is in the area covered by the particular partial image. Based on the visibility probability, it is thus possible to determine whether a piece of image information affecting the partial image is faulty due to camera blindness and should therefore not be evaluated in the corresponding functions or should be evaluated only to a limited extent. The objects included for determining the visibility value may be, for example, detected lanes or other vehicles. The object detection may be carried out by separate object detection devices. The object detection may be based on the instantaneous image of the camera or based on chronologically preceding images.

According to one specific embodiment, the method according to the present invention may include a step of determining edge contours of the image for each of the partial images, a step of setting a blindness threshold value as a function of a brightness of the image, and a step of determining a blindness value for each of the partial images on the basis of the edge contours of the particular partial images, using the blindness threshold value, and a step of determining a blindness probability for each of the partial images on the basis of the blindness values and the visibility probability. The exemplary embodiments and/or exemplary methods of the present invention may thus provide a method for detecting a blindness of the camera and checking a visibility of the camera. The accuracy of the method according to the present invention may be increased by the fact that the blindness probability is based on the blindness detection as well as on the visibility probability. The blindness probability defines the probability with which a blindness of the camera or a lack of visibility of the camera is in the area covered by the particular partial image.

Based on the blindness probability, it is thus possible to determine whether a piece of image information affecting the partial image is faulty due to a camera blindness and should therefore not be evaluated in the corresponding functions or should be evaluated only to a limited extent. An edge contour may run along a brightness limit or luminescence limit within the image. An edge may thus define a brightness difference or a luminescence difference. Characteristics of the edge contours, for example the directions or lengths thereof, may be evaluated to determine the blindness values. The blindness values may indicate whether or not blindness has occurred with regard to the partial image. To determine a blindness value, a special characteristic, for example an edge slope, may be compared with a threshold value. The threshold value may be increased or decreased as a function of the brightness of the image. The brightness may thus have a direct influence on an identification of the blindness for the particular partial images.

According to one specific embodiment, the camera image may be divided into multiple rows and multiple columns in the division step. For example, it is sufficient for the lane detection system to check only the bottom row or the bottom rows of partial images for blindness. For example, if blindness has occurred in a top row, this affects only the functions which evaluate the top row of partial images. A correspondingly high blindness probability may be specified for these functions. However, a lower blindness probability may be specified for the remaining functions.

The blindness threshold value may be set on the basis of a brightness characteristic. The brightness characteristic may have different blindness threshold values for different brightness levels of the image. In this way, the sensitivity of the blindness detection may be, for example, reduced for a darker image and increased for a brighter image.

The method according to the present invention may include a step of receiving a piece of object information from an object detecting device and a step of ascertaining the number of objects detected in the particular partial image on the basis of the provided object information. The object information may be provided by one or multiple object detecting devices which carry out an object detection with the aid of the camera. An object which extends over multiple partial images may be counted for each of the partial images.

If many objects are counted in a partial image, this indicates that the camera is not blind at least with regard to this partial image. If no objects are counted, on the other hand, this may be an indication of a camera blindness.

In the step of determining the visibility value, a visibility value of a partial image may be set to a predetermined value when the number of objects detected in the particular partial image exceeds a predetermined number of objects. If more objects than the predetermined number of objects are detected, it may be assumed with a high degree of probability that no blindness has occurred. The predetermined value may thus represent the fact that no blindness is assumed, or in other words visibility is assumed.

In the step of determining the visibility value, a visibility value of a partial image may be reduced by a difference value if no object is detected in the partial image within a predetermined time interval. The reduced visibility value represents that fact that an increased probability of a blindness having occurred is assumed, or a lower visibility probability is assumed.

According to one specific embodiment, in the step of determining the blindness probability, a blindness value and a visibility value of the particular partial images may be subtracted for each of the partial images. A linking of this type is meaningful and may be easily implemented.

The method according to the present invention may furthermore include a step of determining a blindness signal on the basis of blindness probabilities of a selection of the partial images. The blindness signal may define a blindness probability of the camera in an area including the selection of the partial images. The blindness signal may be provided to a function for evaluating or further processing those partial images of the image or additional images of the camera which are included in the selection.

The present invention furthermore provides a device for detecting the blindness and checking the visibility of a camera in the surroundings of an automobile, the device being configured to carry out or implement the steps of the method according to the present invention. The object of the present invention may also be achieved quickly and efficiently with the aid of this embodiment variant of the present invention in the form of a device.

In the present case, a device may be understood to be an electrical unit which processes sensor signals and outputs control signals as a function thereof. The device may have an interface which may be configured as hardware and/or software. In a hardware configuration, the interfaces may be, for example, part of a so-called system ASIC, which includes a wide range of functions of the device. However, it is also possible for the interfaces to be separate, integrated circuits or to be made at least partially of discrete components. In a software configuration, the interfaces may be software modules which are provided, for example, on a microcontroller, along with other software modules.

A computer program product having program code is also advantageous, which is stored on a machine-readable carrier such as a semiconductor memory, a hard disk memory or an optical memory, and is used to carry out the method according to one of the specific embodiments described above when the program is executed on a device.

The exemplary embodiments and/or exemplary methods of the present invention are explained in greater detail below by way of example on the basis of the attached drawings.

BRIEF DESCRIPTION OF THE DRAWINGS

FIG. 3 shows a flow chart of a segment of a method according to the present invention, according to one exemplary embodiment of the present invention.

FIG. 4 shows a flow chart of another segment of a method according to the present invention, according to one exemplary embodiment of the present invention.

DETAILED DESCRIPTION

Figure 1:
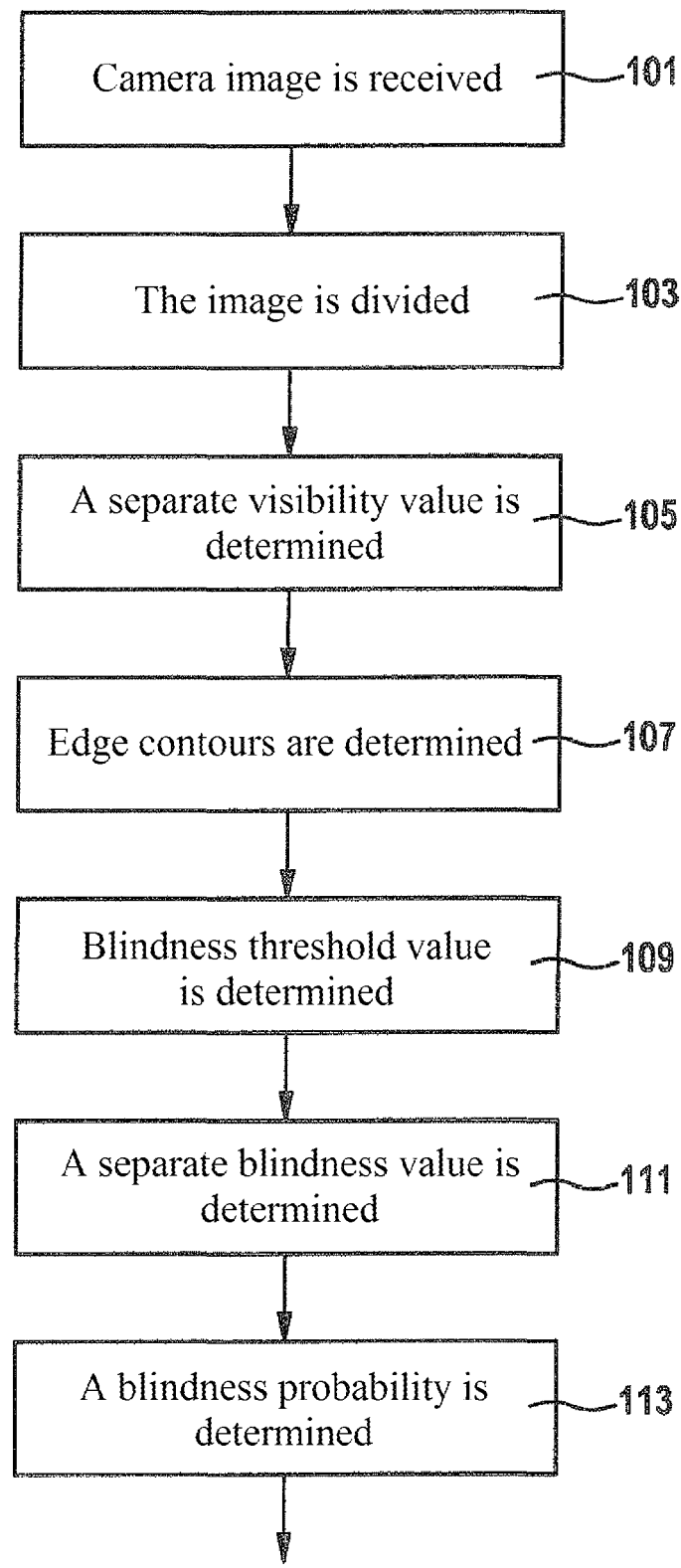
FIG. 1 shows a flow chart of one exemplary embodiment of the present invention.

In the following description of exemplary embodiments of the present invention, identical or similar reference numerals are used for the elements which are illustrated in the different figures and have similar functions, and these elements will not be described repeatedly.

FIG. 1 shows a flow chart of a method for detecting the blindness and checking the visibility of a camera in the surroundings of an automobile, according to one exemplary embodiment of the present invention. A camera image is received in a step 101. The camera image may be received directly from the camera in the form of a raw image, or it may be received from a preprocessing device in the form of a preprocessed image. The camera image is divided into a plurality of partial images in a step 103. For example, three rows and three columns may be created, so that the camera image is divided into nine partial images. Alternatively, the camera image may be divided in a different way, and more or fewer than nine partial images may be created. The partial images may each cover different image areas. Alternatively, the partial images may partially overlap.

In a step 105, a separate visibility value is determined for each of the partial images. A variable of the visibility value depends in each case on whether objects are detected in the assigned partial image and, if objects are detected, how many objects are detected. The detection of the objects may be part of the method according to the present invention, or it may be carried out separately therefrom. If the object detection is carried out separately, the method according to the present invention may be provided with corresponding object information from which the number of objects per partial image may be ascertained.

In a step 107, edge contours are determined for each partial image. This may take place on the basis of known methods for determining edges in an image. A blindness threshold value is determined and set in a step 109. The blindness threshold value is set as a function of a brightness of the image. For this purpose, the brightness of the image may be initially determined, and a blindness threshold value corresponding to the brightness may be subsequently selected. In a step 111, a separate blindness value is determined for each partial image. The blindness value is determined in that a value for each partial image is formed on the basis of the edge contours of the particular partial image and compared with the blindness threshold value. The blindness value may be set as a function of a comparison result. For example, the blindness value may have a first value when the blindness threshold value is exceeded and a second value when the blindness value drops below the blindness threshold value. The first value may provide an indication of an existing blindness for the corresponding partial image, and the second value may provide an indication of an existing non-blindness for the corresponding partial image, or vice versa. In a step 113, a blindness probability is determined for each of the partial images. The blindness probability for a partial image is determined on the basis of the blindness value and the visibility value of the particular partial image.

An assigned visibility value, an assigned blindness value, and an assigned blindness probability based thereon are thus determined for each of the partial images. The blindness probability of a partial image indicates the probability of the camera being blind in an area covered by the partial image.

The blindness values and the visibility values may be determined in parallel. The blindness values and the visibility values, and thus the blindness probabilities, may each be determined for all partial images or only for certain partial images. The method according to the present invention may be repeated continuously or carried out in response to a query.

According to one exemplary embodiment, a visibility probability may be determined for each of the partial images on the basis of the visibility values of the particular partial images. In this case, steps 107, 109, 111 may be omitted. The determination of the visibility probability may be carried out instead of step 113.

Blindness probabilities or visibility probabilities of a quantity of partial images may be linked with each other to determine a total blindness probability or total visibility probability for a quantity of partial images. The total blindness probability, total visibility probability or a signal based thereon may be provided to a function which evaluates or further processes an area of the camera image which is covered by the quantity of partial images. For example, the signal based on the total blindness probability or the total visibility probability may include a warning of a detected blindness or nonexistent visibility when an average blindness probability or visibility probability formed from the blindness probabilities or visibility probability of the quantity of partial images exceeds or drops below a limiting value. Alternatively, the signal based on the total blindness probability or total visibility probability may include a warning of the detected blindness when the blindness probability of one or multiple partial images exceeds or drops below a limiting value.

Figure 2:
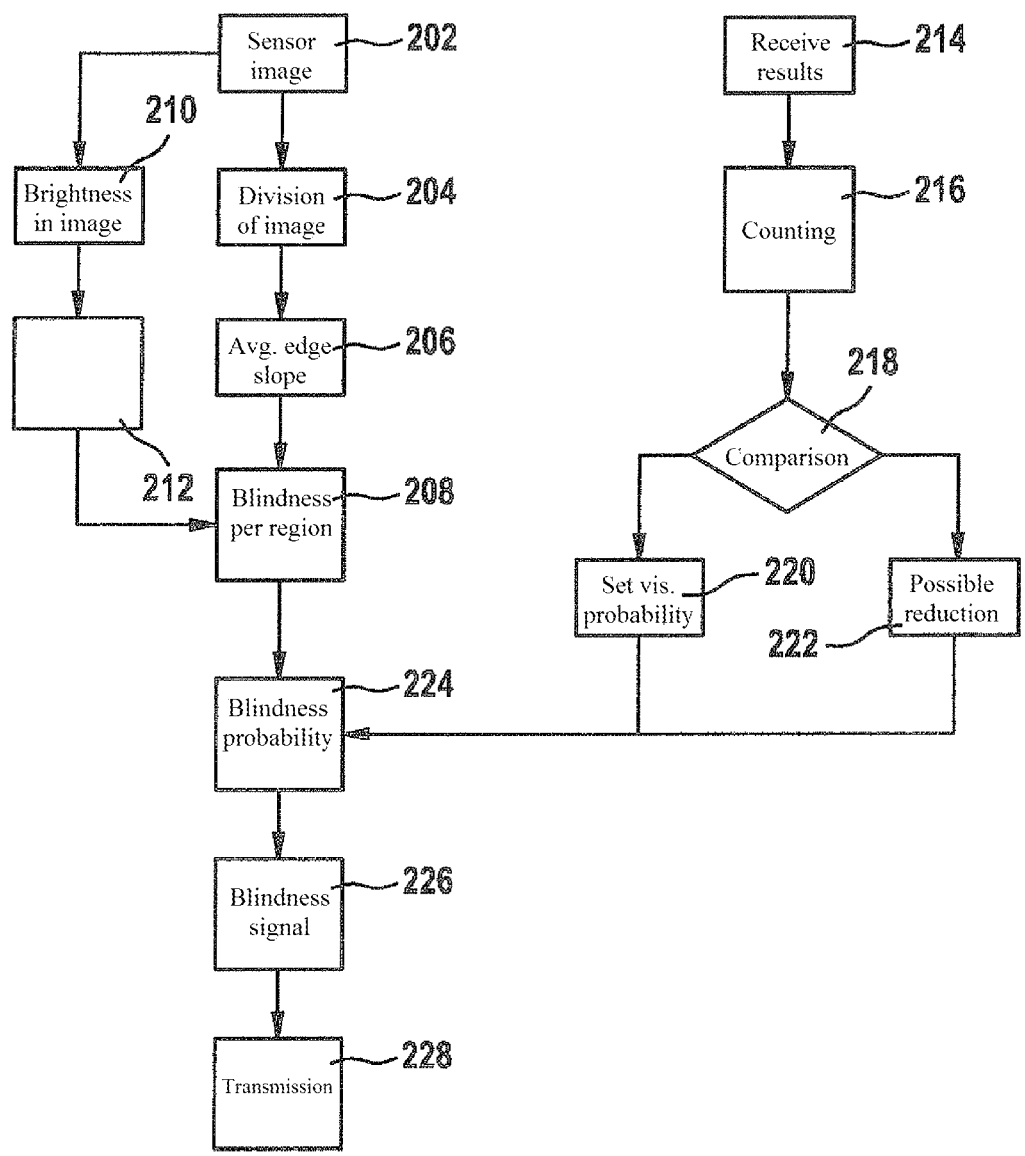
FIG. 2 shows a flow chart of another exemplary embodiment of the present invention.

FIG. 2 shows a flow chart of a method for detecting the blindness and checking the visibility of a camera in the surroundings of an automobile, according to another exemplary embodiment of the present invention.

A sensor image 202, which may correspond to a camera image, is shown. A division of image 202 into nine regions is carried out in a step 204. The nine regions form a 3×3 matrix. A determination 206 of the average edge slope per region follows. The blindness per region is determined in a step 208 as a function of a threshold value.

Parallel to steps 202, 204, the brightness in image 202 or in a region may be determined in a step 210. A threshold value may be determined in a step 210. For this purpose, a characteristic may represent the dependency between the threshold value and the brightness. The threshold value may be used to determine the blindness in step 208.

Again parallel to steps 202, 204, 208, results of measuring algorithms may be received in a step 214. The measuring algorithms may be configured to detect, for example lanes, objects or traffic signs, collectively referred to as objects, on the basis of sensor image 202 or on chronologically preceding images in sensor image 202. A counting of the number of objects detected in one of the nine regions during a time interval may be carried out in a step 216. A threshold value comparison 218 may subsequently be carried out. If there are more detected objects in the region than specified by a threshold value, a visibility probability for this region may be set to 100% in a step 220. However, if there are no more detected objects in the region than specified by a threshold value, the visibility probability for this region may be reduced in a step 222. For example, an instantaneous visibility probability for this region may be formed from an existing visibility probability for this region by subtracting the value 1 from the existing visibility probability. In this case, the following applies: visibility probability=visibility probability−1.

Steps 202, 204, 206, 208, 210, 212 are used for detecting blindness. Steps 214, 216, 218, 220, 222 are used for detecting visibility.

The blindnesses determined in step 208 and the visibility probabilities determined in steps 220, 222 are combined in a step 224, and a blindness probability is determined. A separate blindness probability may be determined for each region. According to this exemplary embodiment, the following applies: Blindness probability=blindness−visibility. A visibility value may correspond to the visibility probability. A blindness signal is determined in a step 226 for each function to which blindness information is supplied by the method according to the present invention. A blindness signal which is determined for a certain function may be determined from blindness probabilities of different regions. A transmission of the blindness signal(s) is carried out in a step 228.

Individual method steps for the blindness detection and visibility check according to the present invention are described in greater detail below according to additional exemplary embodiments.

FIG. 3 shows a block diagram of a blindness detection system according to one exemplary embodiment of the present invention. The figure shows an imager or image converter 302, which is configured to provide a raw image to a device 308 for blindness detection. The device 308 for blindness detection is configured to determine a blindness matrix on the basis of the raw image and to provide it to a device 326 for signal processing. Device 326 for signal processing is configured to provide signals to consumers of the blindness detection system on the basis of the blindness matrix.

With regard to the exemplary embodiment illustrated in FIG. 2, imager 302 may be configured to provide sensor image 202. For example, method steps 204, 206, 208, 210, 212, 224 may be implemented in device 308, and method steps 226, 228 may be implemented in device 326.

For the purpose of blindness detection, each image, for example the image provided by imager 302, may be divided into nine regions of equal size. Alternatively, the image may be divided into more than or fewer than nine regions. A blindness probability may be calculated, for example, in device 308, for each region. The blindness probability may be based on the structures found in the image. The structures may be edges. The signals for the individual blindness consumers may be determined in a further component, which may correspond to device 326. Blindness consumers may include, for example a VDD, ACC, WHE or RSR. VDD refers to a function for vehicle detection in the dark. It is needed for controlling the headlights. If blindness has occurred, no vehicles are detected, and the vehicle is driven with high beams permanently turned on which results in blinding. ACC refers to an adaptive cruise control system. The vehicle thus starts automatically and must therefore monitor the area ahead of the vehicle; if blindness has occurred, a pedestrian, for example, is not detected. WHE refers to the window heater. If blindness is detected, the heater is started to remove the blindness, if necessary. RSR refers to road sign recognition.

FIG. 4 shows a block diagram of a visibility check and blindness detection system according to one exemplary embodiment of the present invention. The figure shows algorithms 414, which are configured to provide results to a device 418 for checking visibility. Device 418 for checking visibility is configured to determine a visibility matrix on the basis of the results and to provide the visibility matrix to a device 424 for blindness detection and to a device 430 for signal processing. Device 430 for signal processing is configured to provide a "visibility_nio" signal on the basis of the visibility matrix. Device 424 for blindness detection is configured to provide blindness signals on the basis of the visibility matrix. The visibility matrix may have a visibility probability value for each region.

With regard to the exemplary embodiment illustrated in FIG. 2, algorithms 414 may be configured to provide results 214. Device 418 may be configured to implement method steps 216, 218, 220, 222. Device 424 may be configured to implement method step 224.

As in the blindness detection system, the image may be divided into nine regions of equal size for the visibility check. If more than a certain number of objects, for example lanes, VDD or MOV objects, is detected within a time interval of, for example, one second, the corresponding matrix element is set to 100%. If no more objects are detected in the subsequent time intervals, the visibility value decreases by 1%, per time interval. MOV means monocular object verification and should actually be referred to as MOD (object detection), since objects such as cars or motorcycles are detected with the aid of the camera during the day.

The visibility_nio signal may be determined on the basis of the visibility check. In particular, the visibility_nio signal may be determined on the basis of the visibility matrix. If a sufficient number of objects, for example LDA, VDD and MOV objects, have been detected in the image, the visibility_nio signal is set from 1 to 0 according to this exemplary embodiment. The signal is set at the beginning of a terminal 15 cycle. Once visibility has been detected, the visibility_nio signal is transmitted and not recalculated.

A visibility check as well as a blindness detection may thus be carried out on the basis of the results provided by algorithms 414. A detected visibility results in correction of the blindness. According to this exemplary embodiment, however, this applies only to the visibility check on the DPC, i.e., the results of LDA and VDD are used. The visibility percentage is subtracted from the blindness probability. The individual signals of the blindness detection may be calculated on the basis of this new blindness matrix, the so-called corrected blindness matrix. DPC means dual-purpose camera. The camera has only two main functions, to detect lanes and vehicles in the dark.

Figures 5, 6:
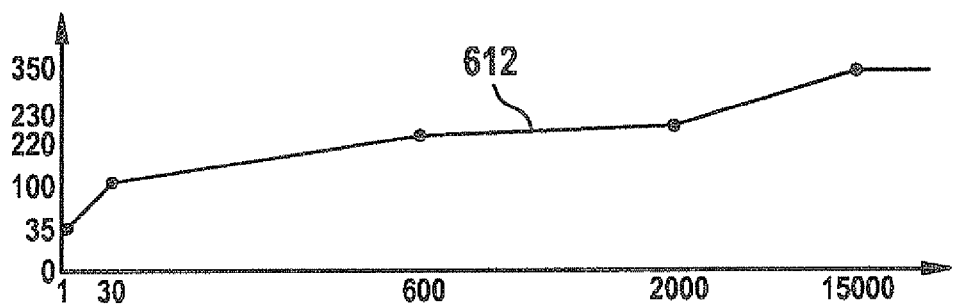
FIG. 5 shows a representation of a camera image according to one exemplary embodiment of the present invention.
FIG. 6 shows a brightness characteristic according to one exemplary embodiment of the present invention.

FIG. 5 shows a sensor image 202 according to one exemplary embodiment of the present invention. The image is divided into three columns and three rows, resulting in nine partial images. Values applying to blindness and visibility are indicated for each partial image, which may be determined for illustrated image 202 in the method according to the present invention.

The following values have been determined for the partial images on the top row, from left to right:

| Blindness indicator: | 74 | 73 | 73 |
|---|---|---|---|
| Corrected blindness: | 74 | 73 | 73 |
| DPC visibility: | 0 | 0 | 0 |
| IPCU visibility: | 0 | 0 | 0 |
| Combined visibility | 0 | 0 | 0 |

The following values have been determined for the partial images in the middle row, from left to right:

| Blindness indicator: | 63 | 67 | 68 |
|---|---|---|---|
| Corrected blindness: | 63 | 67 | 68 |
| DPC visibility: | 0 | 0 | 0 |
| IPCU visibility: | 0 | 100 | 100 |
| Combined visibility | 0 | 100 | 100 |

The following values have been determined for the partial images on the bottom row, from left to right:

| Blindness indicator: | 69 | 69 | 69 |
|---|---|---|---|
| Corrected blindness: | 69 | 69 | 69 |
| DPC visibility: | 0 | 0 | 0 |
| IPCU visibility: | 0 | 0 | 0 |
| Combined visibility | 81 | 0 | 0 |

If the visibility_nio=0 signal has been set once, the visibility detection on the IPCU is no longer carried out. IPCU means image processing control unit. Since the camera may provide only two functions, the other functions are calculated on the IPCU.

Image 202 shows a snow-covered windshield of a vehicle. Image 202 has a higher brightness in the partial images of the top row than in the partial images of the bottom row. No clear structures and no objects are apparent in image 202.

Blindness signals may be determined and provided with the aid of the method according to the present invention. The blindness signals may be determined in method step 226 with regard to FIG. 2.

According to this exemplary embodiment, the areas in the image in which blindness is to be detected are selected for each consumer of the blindness detection system. If the average blindness probability in these regions is higher than a threshold value for a predetermined period of time, for example 45 seconds, the appropriate blindness signal is transmitted.

For the window heater consumer, the entire image is used for detection. All partial images are therefore selected. With regard to the ACC blindness, the middle and bottom portions of the image are used, for example the partial images on the middle and bottom rows shown in FIG. 5. With regard to the VDD blindness, the middle area of the image is used. With regard to the RSR blindness, the middle and top areas are used. With regard to the error memory entry blindness, a debounce time of 30 minutes and the entire image are used.

FIG. 6 shows a brightness characteristic 612 according to one exemplary embodiment of the present invention. Brightness characteristic 612 is plotted on a diagram, a light intensity cbl (camera-based light sensor) is plotted on the abscissa, and a mean value of a threshold value, which represents a sensitivity of the blindness detection, is plotted on the ordinate. Brightness characteristic 612 may be used in method step 212 with regard to FIG. 2. A threshold value, which may be used in method step 208, may be read out from brightness characteristic 612 as a function of the brightness of the image.

The threshold value has a value of 35 for a light intensity of 1 cbl, a value of 100 for a light intensity of 30 cbl, a value of 220 for a light intensity of 600 cbl, a value of 230 for a light intensity of 2,000 cbl and a value of 350 for a light intensity of 15,000 cbl. A lower threshold value may thus be selected for a dark image and a higher threshold value for a bright image. Accordingly, a sensitivity with regard to the identification of the blindness is lower in a dark image than in an extremely bright image. In-between, the sensitivity increases only slightly as the brightness increases.

Brightness characteristic 612 defines a sensitivity of the blindness detection. Very low-structure scenes, which are similar to blindness scenes, occur particularly at night. A brightness-dependent sensitivity of the blindness detection therefore results, as shown by characteristic 612.

The exemplary embodiments described and illustrated in the figures were selected only by way of example. Different exemplary embodiments may be combined with each other in their entirety or with regard to individual features. In addition, one exemplary embodiment may be supplemented by features of another exemplary embodiment. Furthermore, method steps according to the present invention may be repeated as well as carried out in a different order than the one described.

What is claimed is:

1. A method for checking a visibility of a camera for surroundings of an automobile, the method comprising:
   receiving a camera image via a receiving interface;
   dividing the camera image into a plurality of partial images;
   determining a visibility value for each of the partial images based on a number of objects detected in the particular partial image, the visibility value being set to a predetermined value if the number of objects detected in the particular partial image exceeds a predetermined number of objects and the visibility value is reduced by a difference value if no object is detected in the particular partial image within a predetermined time interval; and
   determining a visibility probability for each of the partial images based on the visibility values of the particular partial images, the visibility probability specifying at what probability the visibility of the camera is present in the area of the camera image covered by the particular partial image.

2. The method of claim 1, further comprising:
   determining edge contours of the image for each of the partial images;
   setting a blindness threshold value as a function of a brightness of the image;
   determining a blindness value for each of the partial images by comparing a characteristic of the edge contours to the blindness threshold value; and
   determining a blindness probability for each of the partial images based on the blindness values and the visibility probability.

3. The method of claim 2, wherein the blindness threshold value is set based on a brightness characteristic curve.

4. The method of claim 2, further comprising:
   determining a blindness signal based on blindness probabilities of a selection of partial images, the blindness signal defining a blindness probability of the camera in an area which includes the selection of partial images.

5. The method of claim 1, further comprising:
   receiving a piece of object information from an object detecting device; and
   ascertaining the number of objects detected in the particular partial image based on the provided object information.

6. A method for checking a visibility of a camera for surroundings of an automobile, the method comprising:
   receiving a camera image via a receiving interface;
   dividing the camera image into a plurality of partial images;
   determining a visibility value for each of the partial images based on a number of objects detected in the particular partial image;
   determining a visibility probability for each of the partial images based on the visibility values of the particular partial images;
   determining edge contours of the image for each of the partial images;
   setting a blindness threshold value as a function of a brightness of the image;
   determining a blindness value for each of the partial images based on the edge contours of the particular partial images, using the blindness threshold value; and
   determining a blindness probability for each of the partial images by subtracting the blindness values and the visibility probability.

7. A device for checking a visibility of a camera for surroundings of an automobile, comprising:
   a receiving interface arrangement to receive a camera image;
   a dividing arrangement to divide the camera image into a plurality of partial images; and
   a determining arrangement to determine a visibility value for each of the partial images based on a number of objects detected in the particular partial image, the visibility value being set to a predetermined value if the number of objects detected in the particular partial image exceeds a predetermined number of objects and the visibility value is reduced by a difference value if no object is detected in the particular partial image within a predetermined time interval, and to determine a visibility probability for each of the partial images based on the visibility values of the particular partial images, the visibility probability specifying at what probability the visibility of the camera is present in the area of the camera image covered by the particular partial image.

8. The device of claim 7, further comprising:
   a setting arrangement to set a blindness threshold value as a function of a brightness of the image;

a determining arrangement to determine edge contours of the image for each of the partial images, to determine a blindness value for each of the partial images by comparing a characteristic of the edge contours to the blindness threshold value, and to determine a blindness probability for each of the partial images based on the blindness values and the visibility probability.

9. The device of claim 8, wherein the blindness threshold value is set based on a brightness characteristic curve.

10. The device of claim 8, further comprising:
a determining arrangement to determine a blindness probability for each of the partial images by subtracting the blindness values and the visibility probability.

11. The device of claim 7, further comprising:
a receiving arrangement to receive a piece of object information from an object detecting device; and
an ascertaining arrangement to ascertain the number of objects detected in the particular partial image based on the provided object information.

12. The device of claim 7, further comprising:
a determining arrangement to determine a blindness signal based on blindness probabilities of a selection of partial images, the blindness signal defining a blindness probability of the camera in an area which includes the selection of partial images.

13. A non-transitory computer readable medium having a computer program, which is executable by a processor, comprising:
a program code arrangement having program code for checking a visibility of a camera for surroundings of an automobile, by performing the following:
receiving a camera image via a receiving interface;
dividing the camera image into a plurality of partial images;
determining a visibility value for each of the partial images based on a number of objects detected in the particular partial image, the visibility value being set to a predetermined value if the number of objects detected in the particular partial image exceeds a predetermined number of objects and the visibility value is reduced by a difference value if no object is detected in the particular partial image within a predetermined time interval; and
determining a visibility probability for each of the partial images based on the visibility values of the particular partial images, the visibility probability specifying at what probability the visibility of the camera is present in the area of the camera image covered by the particular partial image.

14. The non-transitory computer readable medium of claim 13, further comprising:
determining edge contours of the image for each of the partial images;
setting a blindness threshold value as a function of a brightness of the image;
determining a blindness value for each of the partial images by comparing a characteristic of the edge contours to the blindness threshold value; and
determining a blindness probability for each of the partial images based on the blindness values and the visibility probability.

15. The non-transitory computer readable medium of claim 14, wherein the blindness threshold value is set based on a brightness characteristic curve.

16. The non-transitory computer readable medium of claim 14, wherein in the determining of the blindness probability for each of the partial images the blindness value and the visibility value of the particular partial images are subtracted.

17. The non-transitory computer readable medium of claim 13, further comprising:
receiving a piece of object information from an object detecting device; and
ascertaining the number of objects detected in the particular partial image based on the provided object information.

18. The non-transitory computer readable medium of claim 13, further comprising:
determining a blindness signal based on blindness probabilities of a selection of partial images, the blindness signal defining a blindness probability of the camera in an area which includes the selection of partial images.

* * * * *